(12) United States Patent
Iida et al.

(10) Patent No.: US 9,383,514 B2
(45) Date of Patent: Jul. 5, 2016

(54) TAPERED OPTICAL FIBER, MANUFACTURING METHOD THEREOF AND MANUFACTURING SYSTEM THEREOF

(71) Applicant: Ishihara Sangyo Co., Ltd., Ueda-shi, Nagano (JP)

(72) Inventors: Hidetoku Iida, Ueda (JP); Rumiko Osada, Ueda (JP); Hideaki Shiratori, Ueda (JP)

(73) Assignee: Ishihara Sangyo Co., Ltd., Ueda-Shi, Nagano (JP)

( * ) Notice: Subject to any disclaimer, the term of this patent is extended or adjusted under 35 U.S.C. 154(b) by 21 days.

(21) Appl. No.: 14/123,754

(22) PCT Filed: May 24, 2013

(86) PCT No.: PCT/JP2013/064509
§ 371 (c)(1),
(2) Date: Dec. 3, 2013

(87) PCT Pub. No.: WO2013/180034
PCT Pub. Date: Dec. 5, 2013

(65) Prior Publication Data
US 2015/0131943 A1    May 14, 2015

(30) Foreign Application Priority Data

May 27, 2012  (JP) ................................ 2012-120344

(51) Int. Cl.
*G02B 6/26*    (2006.01)
*G02B 6/38*    (2006.01)
(Continued)

(52) U.S. Cl.
CPC ............ *G02B 6/26* (2013.01); *B29D 11/00663* (2013.01); *C03B 23/047* (2013.01);
(Continued)

(58) Field of Classification Search
CPC .......... G02B 6/02; G02B 6/1228; G02B 6/14; G02B 6/2552; G02B 6/26; G02B 6/266; G02B 6/3807; B29D 11/00663; C03B 23/047; C03B 23/0493; C03B 37/15
USPC ............. 385/12, 27, 30, 39, 43, 53, 123–128, 385/139, 140; 65/385; 356/432
See application file for complete search history.

(56) References Cited

U.S. PATENT DOCUMENTS

| 5,931,983 A | 8/1999 | Bloom | |
| 6,173,106 B1 * | 1/2001 | DeBoynton | G02B 6/266 385/140 |
| 2009/0237666 A1 * | 9/2009 | Vollmer | G01N 21/77 356/432 |

FOREIGN PATENT DOCUMENTS

| JP | 04-096009 A | 3/1992 |
| JP | 04-096009 A | 5/1992 |

(Continued)

OTHER PUBLICATIONS

Written Opinion of the International Searching Authority and English translation thereof, mailed Aug. 20, 2013.
(Continued)

*Primary Examiner* — Akm Enayet Ullah
*Assistant Examiner* — Michael Mooney
(74) *Attorney, Agent, or Firm* — Muncy, Geissler, Olds & Lowe, P.C.

(57) ABSTRACT

To provide a tapered optical fiber having a good outer diameter accuracy and a high reproducibility, a manufacturing method of the tapered optical fiber, and a manufacturing system of the tapered optical fiber. The above-mentioned problem is solved by manufacturing system 1 of a tapered optical fiber comprising: shifter 11, 12 which reciprocates optical fiber 10 mounted at positions having a prescribed distance therebetween in the longer direction X of optical fiber 10 (the direction of the optical axis); and heating device 13 which heats the reciprocating optical fiber 10 at fixed position O, wherein shifter 13 includes a broadening unit which can increase the mounting distance (L1+L2) of the optical fiber while reciprocating the optical fiber. Shifter 11, 12 has at least two mounting unit which fix the optical fiber 10, and serves as a broadening unit controlling the two mounting unit independently or interlockingly. The control is performed to in order to change at least one of the ranges of reciprocal movement, the reciprocal movement speed, and the broadening width of the optical fiber fixed on the mounting unit.

17 Claims, 10 Drawing Sheets

(51) Int. Cl.
    *C03B 37/023*    (2006.01)
    *C03B 23/047*    (2006.01)
    *C03B 23/049*    (2006.01)
    *C03B 37/15*     (2006.01)
    *G02B 6/255*     (2006.01)
    *B29D 11/00*     (2006.01)
    *G02B 6/14*      (2006.01)

(52) U.S. Cl.
    CPC .............. *C03B23/0493* (2013.01); *C03B 37/15* (2013.01); *G02B 6/2552* (2013.01); *G02B 6/3807* (2013.01); *G02B 6/14* (2013.01)

(56) References Cited

FOREIGN PATENT DOCUMENTS

| | | |
|---|---|---|
| JP | 05-196834 A | 8/1993 |
| JP | 09-005564 A | 1/1997 |
| JP | 2003-329875 A | 11/2003 |
| JP | 2005-043797 A | 2/2005 |
| JP | 2006-064680 A | 3/2006 |
| JP | 2006-064680 A | 5/2006 |
| WO | 00/41016 A | 7/2000 |

OTHER PUBLICATIONS

Extended European search report dated Dec. 4, 2015.

* cited by examiner (A)

10

(B)

10'

TAPERED OPTICAL FIBER, MANUFACTURING METHOD THEREOF AND MANUFACTURING SYSTEM THEREOF

CROSS REFERENCE TO RELATED APPLICATIONS

This application is a U.S. national stage application of PCT/JP2013/064509 filed on May 24, 2013, and claims priority to, and incorporates by reference, Japanese Patent Application No. 2012-120344 filed on May 27, 2012.

FIELD OF THE INVENTION

The present invention relates to a tapered optical fiber exhibiting a high light transmittance, a manufacturing method of the tapered optical fiber, and a manufacturing system of the tapered optical fiber.

BACKGROUND ART

With increasing communication data and communication speed, active research and development for an advanced information security technology is under way. For an information security technology, a quantum info-communication via a single-photon in a laser light is drawing attention. Quantum info-communication is a communication method in which using an optical fiber, made of a conventional optical fiber for communication a part of which is thinned (also referred to as "tapered optical fiber"), a single atom or a quantum dot is arranged in the tapered optical fiber to be excited by a laser, and the generated photon is taken into a fiber propagation mode.

As a technique for thinning an optical fiber, proposed are techniques described in Patent Documents 1 to 4 below related to an optical fiber coupler which draws and fuses a plurality of optical fibers. For example, Patent Document 1 proposes a technique relating to a manufacturing method of an optical fiber coupler. The manufacturing method of an optical fiber coupler includes: an optical fiber setting step in which at least three optical fibers, from which a jacket is removed, are inserted into a microheater from an opening thereof and arranged parallel to each other in a direction orthogonal or nearly orthogonal to the direction of the opening; and an optical fiber heating and fusing step in which the microheater is reciprocated within a prescribed width dimension in the axis direction of the three optical fibers to heat and fuse the optical fibers, and the optical fibers are drawn in the axis direction. In this technique, optical fibers adjacent to each other in a state, in which at least three optical fibers are arranged in parallel, are uniformly heated to be subjected to a fusing treatment to attain a state in which optical fibers do not have irregularity, thereby obtaining a highly accurate optical fiber coupler.

Patent Document 2 proposes a technique regarding a manufacturing system of an optical fiber coupler. In Patent Document 2, a microheater mounted on a heater support heats and fuses in a prescribed width dimension of cores of two optical fibers from which a jacket is removed and which are arranged adjacent to each other. The manufacturing system of the optical fiber coupler is characterized in that the above-mentioned microheater is mounted on a heater support via a reciprocating shifter, in order to adjust the length of a heated and fused portion to any length, and to reciprocate the microheater in the axis direction of two optical fibers. By this technique, a heated and fused portion of an optical fiber coupler which is heated and fused by a microheater can be set to have a large width dimension and any width dimension, thereby obtaining a sufficient intensity and setting any branch state of a light.

Patent Document 3 proposes a technique regarding a manufacturing method of a wide-band optical fiber coupler formed by heating one optical fiber to be subjected to a predrawing process, and fusing and drawing the optical fiber with unprocessed optical fiber by heating. The manufacturing method of a wide-band optical fiber coupler includes: allowing a heating system to move along an optical fiber to heat the optical fiber in a predrawing process; starting drawing of the optical fiber when the heating system reaches the end of the region to be heated; and predrawing the optical fiber to a prescribed length. By this technique, a plurality of optical fibers is fused without a gap at fusing rate of 100%, thereby effectively manufacturing optical fiber couplers at high yield.

Patent Document 4 proposes a technique regarding a manufacturing method of an optical fiber coupler in which part of a plurality of optical fibers are heated, fused, and drawn to form a fused and drawn portion, and a light is branched and coupled by the fused and drawn portion. The manufacturing method of an optical fiber coupler performs to fuse and draw a plurality of optical fibers while measuring the tension exerted on the plurality of optical fibers and while controlling the drawing speed of the optical fibers or the drawing speed and the heating condition of the optical fibers in order to make the tension close to zero. By this technique, deterioration of the optical properties (in particular, the polarization dependence) of the optical fiber coupler due to generation of a tension can be prevented, whereby an optical fiber coupler having a high performance optical fiber can be produced.

PRIOR ART REFERENCES

Patent Documents

Patent Document 1: Japanese Laid-Open Patent Application No. 2005-43797
Patent Document 2: Japanese Laid-Open Patent Application No. 2003-329875
Patent Document 3: Japanese Laid-Open Patent Application No. Hei9-5564
Patent Document 4: Japanese Laid-Open Patent Application No. Hei5-196834

SUMMARY OF THE INVENTION

The Problems Solved by the Invention

Since the above-mentioned techniques of Patent Documents 1 to 4 relate to an optical fiber coupler in which a plurality of optical fibers are drawn and welded, it has been difficult to manufacture a tapered optical fiber, a part of which is thinned to a prescribed size such as a tapered optical fiber for a quantum info-communication.

For example, in techniques of Patent Documents 1 to 3, a flame is reciprocated to heat an optical fiber. However, such a flame fluctuates, and the temperature of a portion of the optical fiber heated by the flame does not become constant, and tapered optical fibers having uniform outer diameters can not be manufactured with a high precision and with good reproducibility, which is problematic. In techniques of Patent Document 4, since any of an optical fiber and a heating unit is not allowed to move, a part of an optical fiber is locally heated and drawn. For this reason, the tapered shape of the optical fiber can not be controlled, and similarly to the above, tapered optical fibers having uniform outer diameters can not be manufactured with a high precision and with a good reproducibility, and at the same time, optical transmission loss can not be reduced, which is problematic.

The present invention has been made in order to solve the above-mentioned problems, and an object of the present invention is to provide a tapered optical fiber which has a good outer diameter accuracy and is highly reproducible, and a manufacturing method thereof and a manufacturing system thereof.

Problem Resolution Means

The manufacturing system of the tapered optical fiber of the present invention for solving the above-described problems includes: a shifter which reciprocates an optical fiber mounted at positions having a prescribed distance therebetween in the direction of the optical axis of the optical fiber, and a heating device which heats the reciprocating optical fiber at a fixed position, wherein the shifter serves as a broadening unit which increases the mounting distance of the optical fiber while reciprocating the optical fiber.

According to the present invention, since a shifter, which reciprocates an optical fiber mounted at positions having a prescribed distance therebetween in the direction of the optical axis of the optical fiber, serves as a broadening unit which can increase the mounting distance of the optical fiber, the mounting distance of the optical fiber can be expanded and the optical fiber can be drawn when the optical fiber is reciprocated while heating. Since heating of the reciprocating optical fiber is performed at a fixed position, there are no unstable elements with respect to temperature due to, for example, flame fluctuation, and the optical fiber can be heated at a constant temperature. As the result, since the optical fiber can be drawn under a condition in which the temperature is controlled with a high precision, a tapered optical fiber having a good outer diameter accuracy and a high reproducibility can be manufactured. By the thus manufactured tapered optical fiber, light transmission loss can be reduced, thereby increasing the light transmittance.

In the manufacturing system of the tapered optical fiber of the present invention, the shifter has at least two mounting units which fix the optical fiber, and the broadening unit is configured to independently or interlockingly control the at least two mounting unit.

According to the present invention; since both sides of the optical fiber are fixed by at least two mounting unit on the shifter, and the broadening unit can control (broadening control) the mounting unit independently or interlockingly, drawing of the optical fiber can be performed freely by the control. Therefore, a tapered fiber having a good outer diameter accuracy and a high reproducibility can be manufactured.

In the manufacturing system of the tapered optical fiber of the present invention, the control is performed by the broadening unit in order to change at least one of the range of reciprocal movement, the reciprocal movement speed, and the broadening width of the optical fiber fixed on the mounting unit.

According to the present invention, since a control can change one, or two or more selected from the range of reciprocal movement, the reciprocal movement speed, and the broadening width of an optical fiber fixed by mounting unit, the control can perform a drawing control of the optical fiber. Therefore, a tapered fiber having a good outer diameter accuracy and a high reproducibility can be manufactured.

The manufacturing method of the tapered optical fiber of the present invention for solving the above-described problems includes: a reciprocating step in which an optical fiber mounted at positions having a prescribed distance therebetween is reciprocated in the direction of the optical axis of the optical fiber; a heating step in which the reciprocating optical fiber is heated at fixed position, wherein, during the heating performed while reciprocating the optical fiber, the mounting distance of the optical fiber is increased and the optical fiber is drawn.

According to the present invention, since an optical fiber is heated at a fixed position while reciprocating the optical fiber, there are no unstable elements with respect to temperature due to, for example, flame fluctuation, and the optical fiber can be heated at a constant temperature. Since the optical fiber is drawn while the mounting distance of the optical fiber is increased during the heating, a tapered optical fiber having a good outer diameter accuracy and a high reproducibility can be manufactured. The thus manufactured tapered optical fiber can have reduced light transmission loss, thereby increasing the light transmittance.

In the manufacturing system of the tapered optical fiber of the present invention, drawing of the optical fiber is performed by controlling at least two mounting unit which fix the optical fiber independently or interlockingly.

In the manufacturing method of a tapered optical fiber of the present invention, t the control is performed in order to change at least one of the range of reciprocal movement, the reciprocal movement speed, and the broadening width of the optical fiber fixed on the mounting unit.

The tapered optical fiber of the present invention for solving the above-described problems is a fiber manufactured by the above manufacturing system or by the manufacturing method, and has in the direction of the optical axis a thin portion having a minimum outer diameter of from 200 nm to 800 nm, wherein the tapering profile of the thin portion is symmetrical or asymmetrical in the direction of the optical axis.

Since the tapered optical fiber according to the present invention is a seamless tapered optical fiber containing in the direction of the optical axis a thin portion having a minimum outer diameter of from 200 nm to 800 nm, wherein the tapering profile of the thin portion of the optical fiber is symmetrical or asymmetrical shape controlled in the direction of the optical axis, such a tapered optical fiber has a good outer diameter accuracy and has a high reproducibility. As the result, the light transmission loss can be reduced, and the light transmittance is increased.

In the manufacturing method of a tapered optical fiber of the present invention, the tapering profile of the thin portion of the optical fiber comprises one, or two or more inflection portion T where rate of change in the outer diameter thereof in the direction of the optical axis decreases. Further, the inflection portion is preferably in a range of 20 μm to 30 μm.

According to the present invention, the tapering profile of the thin portion of the optical fiber comprises one, or two or more inflection portion where rate of change in the outer diameter thereof in the direction of the optical axis decreases, in particular, the inflection portion exist in a range of 20 μm to 30 μm. As the result, the optical fiber is preferably applied as an optical fiber whose transmission wavelength is about 800 nm to 1600 nm.

The tapered optical fiber module of the present invention for solving the above-described problems includes: the above tapered optical fiber; and a frame body accommodating therein the tapered optical fiber.

The tapered optical fiber module according to the present invention can also be used as an optical fiber module for a quantum info-communication or the like.

Efficacy of the Invention

By the manufacturing system of the thin optical fiber of the present invention, the mounting distance of the optical fiber can be expanded and the optical fiber can be drawn when the optical fiber is reciprocated while heating. Further, there are no unstable elements with respect to temperature due to, for example, flame fluctuation, and the optical fiber can be heated at a constant temperature. As the result, since the optical fiber can be drawn under a condition in which the temperature is controlled with a high precision, a tapered optical fiber having a good outer diameter accuracy and a high reproducibility can be manufactured. By the thus manufactured tapered optical fiber, light transmission loss can be reduced, thereby increasing the light transmittance.

By the manufacturing method of the thin optical fiber of the present invention, there are no unstable elements with respect to temperature due to, for example, flame fluctuation, and the optical fiber can be heated at a constant temperature. Further, a tapered optical fiber having a good outer diameter accuracy and a high reproducibility can be manufactured. The thus manufactured tapered optical fiber can have reduced light transmission loss, thereby increased light transmittance.

By the manufacturing method of the tapered optical fiber and the tapered optical fiber module of the present invention, the tapered optical fiber is a seamless tapered optical fiber or the tapered optical fiber module has a seamless tapered optical fiber containing in the direction of the optical axis a thin portion of the optical fiber having a minimum outer diameter of from 200 nm to 800 nm, and the tapering profile of the thin portion of the optical fiber is symmetrical or asymmetrical shape controlled in the direction of the optical axis. Therefore, such a tapered optical fiber has a good outer diameter accuracy and has a high reproducibility. As the result, the light transmission loss can be reduced, and the light transmittance is increased.

BRIEF DESCRIPTIONS OF THE DRAWINGS

EMBODIMENTS OF THE INVENTION

A tapered optical fiber according to the present invention, a manufacturing method thereof and a manufacturing system thereof will now be described in detail with reference to the Drawings. The present invention should not be limited to the following embodiment, and may be carried out being modified in a variety of manners within the gist of the present invention.

[Manufacturing System and Manufacturing Method of Tapered Optical Fiber]

Figure 1:
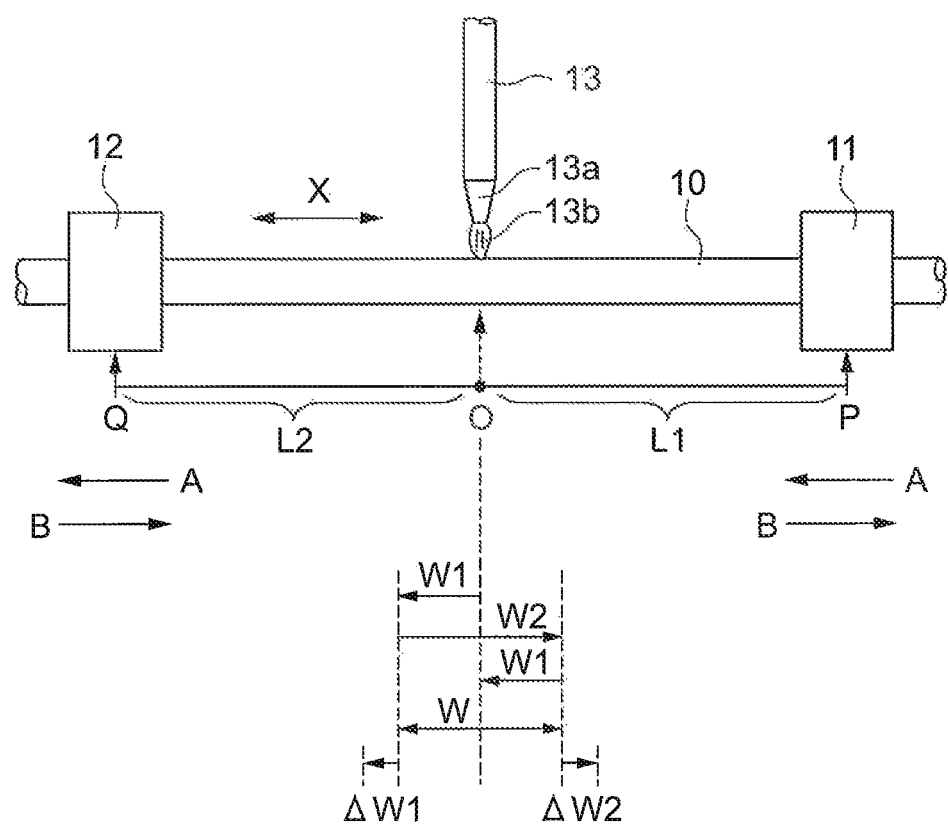
FIG. 1 is an explanatory drawing of a manufacturing principle of a tapered optical fiber of the present invention.
Figure 2:
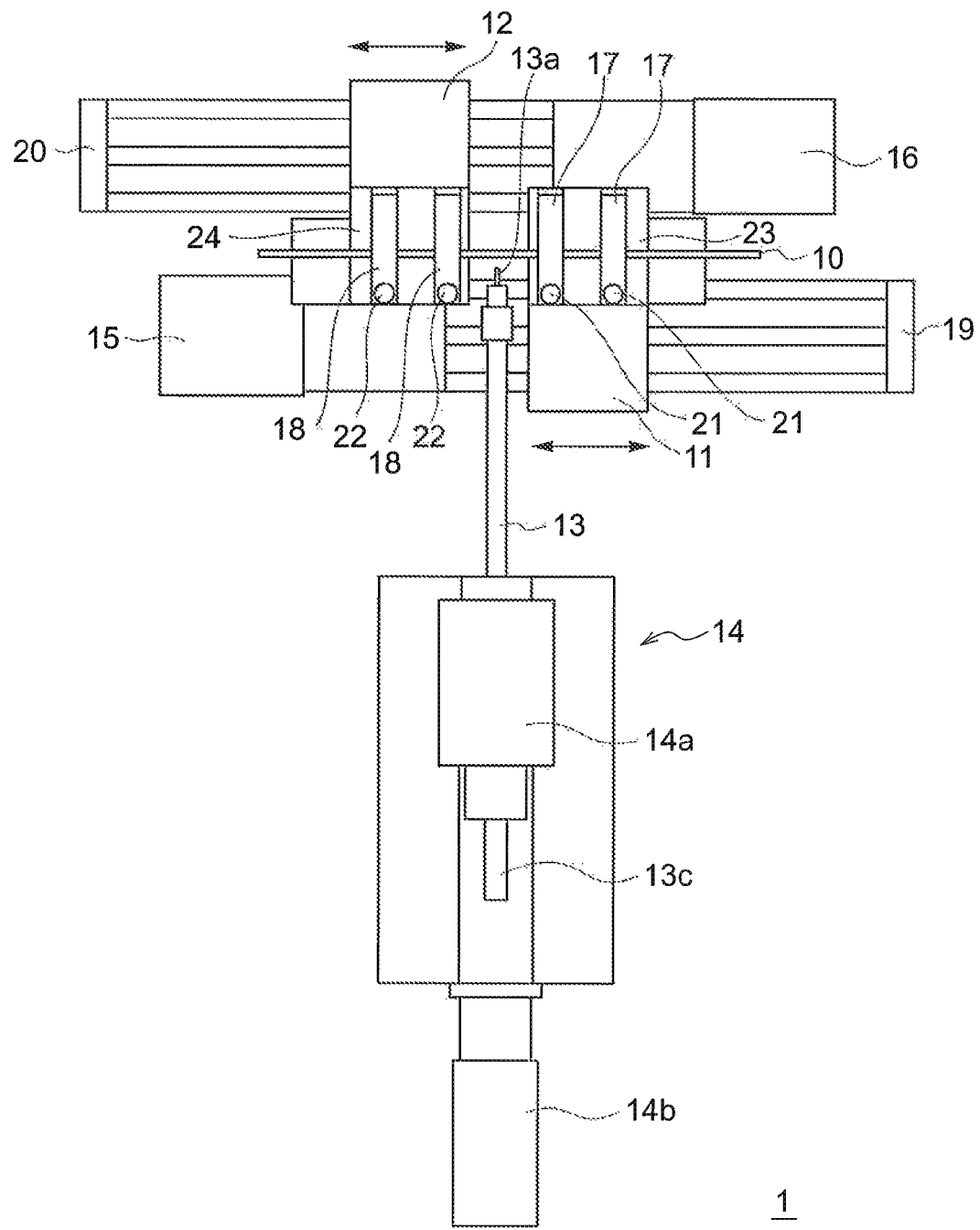
FIG. 2 is a schematic plan view illustrating one example of manufacturing system of a tapered optical fiber according to the present invention.
Figure 3:
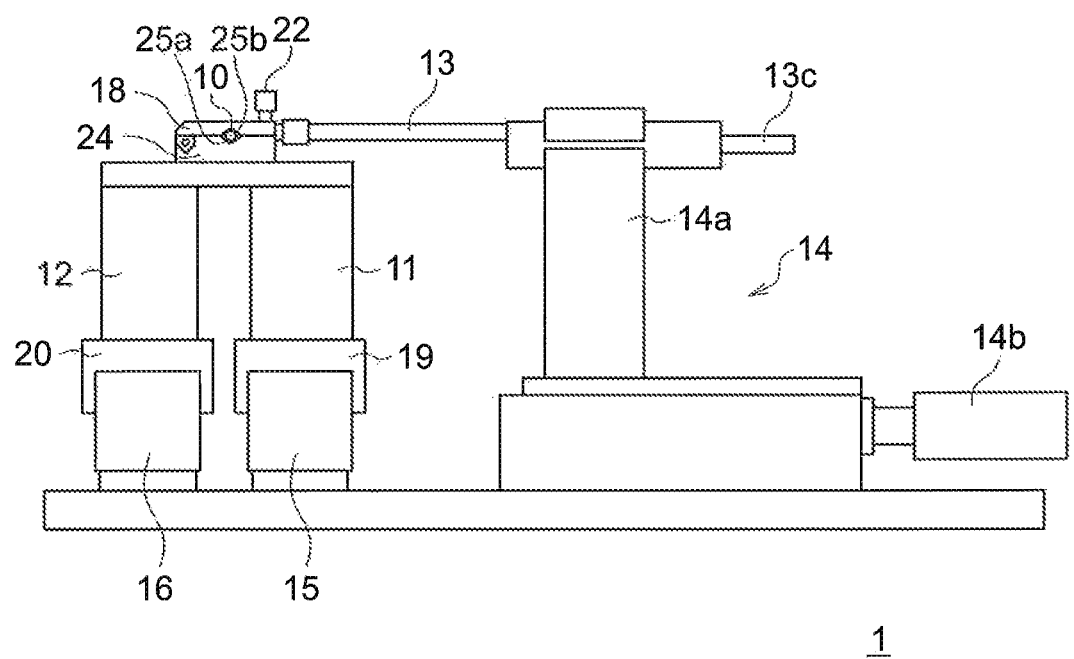
FIG. 3 is a schematic side view of a manufacturing system of a tapered optical fiber illustrated in FIG. 2.

Manufacturing system 1 of tapered optical fiber 10' according to the present invention has, as illustrated in FIGS. 1 to 3, shifters 11, 12 which reciprocate (in A direction, B direction) optical fiber 10 mounted at positions having prescribed distance (L1+L2) therebetween in longer direction X of optical fiber 10 (the direction of the optical, axis); and heating device 13 which heats reciprocating optical fiber 10 at a fixed position O. The manufacturing system is characterized in that shifters 11, 12 has a broadening unit which can increase mounting distance (L1+L2) of optical fiber 10 while reciprocating the optical fiber.

Since, in such manufacturing system 1, shifters 11, 12 which reciprocate the mounted optical fiber 10 in the longer direction X has a broadening unit which can increase mounting distance (L1+L2) of optical fiber 10, mounting distance (L1+L2) of optical fiber 10 can be increased and the optical fiber can be drawn when optical fiber 10 is reciprocated while heating. Since heating of reciprocating optical fiber 10 is performed at the fixed position O, there are no unstable elements with respect to temperature due to, for example, flame fluctuation, and the optical fiber can be heated at a constant temperature. As the result, since the optical fiber 10 can be drawn under a condition in which the temperature is controlled with a high precision, a tapered optical fiber 10' having a good outer diameter accuracy and a high reproducibility can be manufactured. By the thus manufactured tapered optical fiber 10', light transmission loss can be reduced, and then the light transmittance can be increased.

Each configuration will now be described in detail.

<Optical Fiber>

Optical fiber 10 is prepared as a raw material which is drawn by this manufacturing system 1 to be processed into tapered optical fiber 10'. To optical fiber 10 to be prepared, a glass optical fiber using glass for a core which transmits a light is applied. Among optical fibers, a quartz optical fiber using quartz is preferably applied. While a glass used in glass optical fibers other than a quartz fiber has many components, a quartz optical fiber, using a quartz glass with ultra-high purity, has a better light transparency than that of a glass fiber, and can precisely transmit optical information over a long distance.

Optical fiber 10 may be a single mode optical fiber or a multi mode optical fiber. Optical fiber 10 may be one which is polymer coated. Examples of a polymer which covers optical fiber 10 include a variety of resins such as fluorocarbon resin, silicone resin, or polyimide resin. The outer diameter of optical fiber 10 is not particularly restricted, and preferably in a range of from 200 nm to 800 nm when the optical fiber is used, for example, for a quantum info-communication. When polymer coated optical fiber 10 is applied, before the application the polymer is removed at a heating portion for drawing.

Prepared optical fiber 10 is mounted on shifters 11, 12. Then, the optical fiber is subjected to a drawing process into tapered optical fiber 10' having fine diameter region having a minimum outer diameter of, for example, from 200 nm to 800 nm by manufacturing system 1 and a manufacturing method according to the present invention.

<Shifter>

Shifters 11, 12 are, as illustrated in FIG. 1 and FIG. 2, systems for reciprocating (in A direction, B direction) optical fiber 10 mounted at positions having a prescribed distance (L1+L2) therebetween in the longer direction X of optical fiber 10. Shifters 11, 12 have at least two mounting units 17, 18 for fixing optical fiber 10, ands linear guides 19, 20 for reciprocating mounting units 17, 18 linearly in the longer direction X.

(Mounting Unit)

Mounting units 17, 18 are fixing units for fixing optical fiber 10. Two mounting units 17, 18 as illustrated in FIG. 1 and FIG. 2 are also referred to as "first clamp 17", "second clamp 18", respectively. "At least two mounting units 17, 18" means that mounting units 17, 18 individually are provided at least on one side (first shifter 11 side) and the other side (second shifter 12 side) of optical fiber 10 in the longer direction X, and, as illustrated in FIG. 2, two or more mounting units (17, 17, 18, 18) may be provided on each side. Specifically, in the example of FIG. 2, V-groove 25a (see FIG. 3) for mounting optical fiber 10 is provided on the surface of first stage 23 reciprocated by first shifter 11 and on the surface of second stage 24 reciprocated by second shifter 12; optical fiber 10 is guided by V-grooves 25a, 25a each provided on stages 23, 24 and is fixed on stages 23, 24 by fixing jigs 21, which sandwich the optical fiber from upside.

In an example of FIG. 2, mounting units 17, 18 are constituted by iron stages 23, 24 having magnetism and fixing jigs 21, 22 magnetized by stages 23, 24. Stages 23, 24 are preferably made of a ferromagnetic material such as iron which is magnetized by a magnet, and fixing jigs 21, 22 are preferably a magnet. The magnet is not particularly restricted, but one which is suitable for fixing optical fiber 10 is selected, and may be selected from, for example, a multiple purpose magnet such as ferrite magnet, or a rare-earth magnet such as samarium cobalt magnet or neodymium magnet. Preferably, fixing jigs 21, 22 are also provided with V-grooves 25b, 25b corresponding to V-grooves 25a, 25a provided on stages 23, 24.

(Linear Guide)

Linear guides 19, 20 are guides for reciprocating mounting units 17, 18 in the longer direction X of optical fiber 10, and systems for attaining linear reciprocation of mounting units 17, 18. Such linear guides are not particularly restricted, and any guide such as a rail-type linear motion guide, or a ball screw can be used.

(Reciprocation)

Reciprocation in A direction and B direction is, as illustrated in FIG. 1 and FIG. 2, performed by first shifter 11 and second shifter 12 each independently controllable. The first shifter 11 has first driving motor 15, mounting unit 17, and linear guide 19; and the second shifter 12 comprises second driving motor 16, mounting unit 18, and linear guide 20. First driving motor 15 and second driving motor 16 may be arranged on an identical virtual axis as illustrated in FIG. 1, or may be arranged on different virtual axes (two axes) as illustrated in FIG. 2. For first driving motor 15 and second driving motor 16, independently program-controllable motors, preferably stepping motors or the like, are used.

The reciprocation of optical fiber 10 in A direction and B direction performed by first shifter 11 is synchronized with the reciprocation of optical fiber 10 in A direction and B direction performed by second shifter 12. In other words, the movement of optical fiber 10 in A direction is synchronously performed by first shifter 11 and second shifter 12; and the movement of optical fiber 10 in B direction is also synchronously performed by first shifter 11 and second shifter 12.

The movement speed in A direction and the movement speed in B direction may be the same speed or different speeds. Either in the case of the same speed or in the case of different speeds, the speeds at first shifter 11 and at second shifter 12 are individually the same. Usually, the speeds are set to "the same speed". When the movement in A direction and the movement in B direction are the same, the final drawn tapered optical fiber 10' becomes symmetrical. On the other hand, in cases where the movement in A direction and the movement in B direction are different from each other, which are the cases for the purpose of using only one side of a thinned portion, the final drawn tapered optical fiber 10' exhibits a characteristic asymmetrical shape. The movement speed is usually set to any speed in a range of from 1 mm/sec to 30 mm/sec. By setting the movement speed to a speed in this range, dispersion in the minimum outer diameter can be made small, and tapered optical fiber 10' having a high reproducibility can be manufactured more easily.

When, among the above-mentioned movement speed, a lower speed (for example, 1 mm/sec to 10 mm/sec) is employed for the movement, a heat source, concretely, a microtorch (flame 13b) can be made small, and the tapering profile is likely to be made in any shape. On the other hand, when the optical fiber is moved at a higher speed (for example, higher than 10 mm/sec and not higher than 30 mm/), the below-mentioned broadening velocity can be made large; for the need of making the amount of heat large, the microtorch (flame 13b) is needed to be made large, whereby the shape of the tapering profile to be obtained is restricted. Usually, the optical fiber is moved at a lower speed and dispersion in the minimum outer diameter is made small, thereby increasing reproducibility.

The movement speed may be constant or changed to any speed within the above-mentioned range during the operation. In cases where the speed is changed during the operation, for example, the optical fiber may be moved at a relatively low speed at initial stage and moved at a higher speed at a certain time point; alternatively, the optical fiber may be moved at a relatively high speed at initial stage and moved at a lower speed at a certain time point. Such change in the movement speed during operation may be performed for the purpose of making the time required for one cycle constant. Specifically, by changing the tapering profile of tapered optical fiber 10' by making the movement speed low at first and making the movement speed high at the time when the range of reciprocal movement is made large, the light transmittance of tapered optical fiber 10' can be increased.

(Broadening Unit)

Shifters 11, 12 function as a broadening unit. The broadening unit is configured by at least two mounting units 17, 18 controlled independently or interlockingly with shifters 11, 12 to increase mounting distance (L1+L2), thereby drawing optical fiber 10. Specifically, first driving motor 15 of shifter 11 and second driving motor 16 of shifter 12 are program-controlled in order to independently or interlockingly control mounting units 17, 18. In manufacturing system 1 of the present invention, both sides of optical fiber 10 in the longer direction X are fixed by at least two mounting units 17, 18 which shifters 11, 12 have, and each of the broadening unit is configured by shifters 11, 12 each having mounting units 17,

18, by which both sides of optical fiber 10 in the longer direction X are fixed, independently or interlockingly controlled.

In the control of the mounting units 17, 18, one or more of the range of reciprocal movement, the reciprocal movement speed, and the broadening width of optical fiber 10 are changed. By further adding thereto the broadening velocity, in the control of the mounting units 17, 18, one or more of the range of reciprocal movement, the reciprocal movement speed, the broadening width and the broadening velocity of optical fiber 10 are changed. By such a control, optical fiber 10 can be freely drawn.

The drawing of optical fiber 10 is performed by, as illustrated in FIG. 1, heating optical fiber 10 over torch 13b at a fixed position which is not moved on with reciprocating optical fiber 10 (referred to as "fixed position O", or also referred to as "reference point O" since, in the present invention, an optical fiber is moved in A direction and B direction centering on the fixed position) while reciprocating optical fiber 10 in constant range of reciprocal movement W. Then, the range of reciprocal movement W (W+ΔW) is increased while performing heating at fixed position O. The increase in the range of reciprocal movement W (W+ΔW) is a process needed for drawing of optical fiber 10, and is performed at the time when optical fiber 10 is heated to become soft to such a degree that optical fiber 10 can be drawn.

The range of reciprocal movement (W) indicates a width within which optical fiber 10 is reciprocated, and represented by sum of distance W1 by which reference point O of reciprocation moves in A direction and distance W2 by which reference point O of reciprocation moves in B direction (W1+W2). The range of reciprocal movement W defines the length of a portion of optical fiber 10 heated over torch 13b. The length of thin portion S of optical fiber 10 to be thinned is defined based on the range of reciprocal movement W. When the range of reciprocal movement W is large, a region where optical fiber 10 is heated over torch 13b becomes long. By controlling the broadening condition (broadening width, and broadening velocity), tapered optical fiber 10' having long thin portion S can be obtained. On the other hand, when the range of reciprocal movement W is short, the portion of optical fiber 10 heated over torch 13b becomes short. By controlling the broadening condition (broadening width, and broadening velocity), tapered optical fiber 10' having short thin portion S can be obtained.

Although the range of reciprocal movement W differs also depending on the application of the finally obtained tapered optical fiber 10', in the below-mentioned example which is used for a quantum info-communication or the like, the range of reciprocal movement W is preferably about from 5 mm to 20 mm, and optical fiber 10 can be thinned in this range.

By changing the range of reciprocal movement W over time, the tapering profile of thin portion S of tapered optical fiber 10' can be designed arbitrarily. For example, as illustrated in the below-mentioned Experimental Example, by changing the range of reciprocal movement W in each of the steps to reciprocate optical fiber 10, thin portion S heated over torch 13b can be changed. As the result, a portion where the outer diameter of thin portion S of tapered optical fiber 10' is gradually changed, a portion where the outer diameter of thin portion S of tapered optical fiber 10' is relatively largely changed, or the like can be freely made. In particular, as described in the below-mentioned second Experimental Example, the tapering profile of thin portion S of tapered optical fiber 10' has an inflection portion T (see FIG. 7), in which the rate of change in the outer diameter in the longer direction X becomes small, can be achieved by changing the range of reciprocal movement W and the broadening width at portion S of optical fiber 10 adjacent to inflection portion T. As described in the movement speed section, the reciprocal movement speed is represented by the range of reciprocal movement W per unit time.

In the present invention, by broadening (increasing) the range of reciprocal movement W at a given time point, optical fiber 10 is thinned. Thin portion S to be thinned is a portion where optical fiber 10 heated over torch 13b when optical fiber 10 is reciprocated. The portion heated over torch 13b is softens, and then the range of reciprocal movement W is allowed to broaden, whereby optical fiber 10 is thinned. For example, as described in the below-mentioned Experimental Example, stepwise broadening as described in steps 1 to 4 or steps 1 to 5 to reciprocate optical fiber 10 can also be performed. By the stepwise broadening, the tapering profile of thin portion S of tapered optical fiber 10' can be freely designed.

Based on the broadening width (ΔW), the tapering profile of thin portion S of tapered optical fiber 10' is freely designed. For example, optical fiber 10 is allowed to soften by heating over torch 13b while reciprocating optical fiber 10 at a relatively short range of reciprocal movement W at first. Then, the range of reciprocal movement W is increased at the time point when optical fiber 10 softens. As a result, thin portion S of tapered optical fiber 10' can be large. Further, depending on the tapering profile to be obtained, in order to broaden the optical fiber, by making the range of reciprocal movement W smaller again after increasing the range of reciprocal movement W when optical fiber 10 softens only a center portion of thin portion S of tapered optical fiber 10' can be more thinned. As mentioned above, tapered optical fiber 10' having the desired tapering profile can be manufactured by arbitrarily changing range of reciprocal movement W, the reciprocal movement speed, the broadening width, the broadening velocity, or the like.

Broadening width ΔW is the sum of the width (ΔW1) of broadening in A direction and the width (ΔW2) of broadening in B direction. The value of ΔW1 and the value of ΔW2 may be the same or different; only one side of optical fiber 10 may be broadened and the other side of optical fiber 10 may not be broadened. When the value of ΔW1 and the value of ΔW2 are the same, the tapering profile can be made symmetrical. Further; when the value of ΔW1 and the value of ΔW2 are different from each other, the tapering profile can be made asymmetrical. Such broadening width ΔW, broadening width (ΔW1 and ΔW2) in individual direction can be freely set depending on the tapering profile of thin portion S of tapered optical fiber 10' to be obtained.

The broadening of the range of reciprocal movement W is preferably performed when optical fiber 10 softens by heating over torch 13. The timing of the broadening can be defined based on the prior condition settings. Additionally, the timing of the broadening can be varied depending on the type, the outer diameter, the range of reciprocal movement or the reciprocal movement speed of optical fiber 10, the size, the strength, the position, the heating amount or the heating time of torch 13b, or the like.

The heating is performed at fixed position O. As heating device 13, for example, a device, which has gas introducing portion 13c introducing a mixed gas of hydrogen and oxygen, and tip nozzle 13a for generating torch 13b by igniting a gas introduced by gas introducing portion 13c, is used. Heating device 13 generates torch by igniting a mixed gas emitted from the tip of nozzle 13a as torch (flame) 13b. As mentioned above, the heating by torch 13b is controlled by the type, the diameter, the range of reciprocal movement or the reciprocal movement speed of optical fiber 10, or the like. Specifically; the heating is performed by controlling the size, the strength or the position of torch 13b, heating amount, heating time, or the like. By performing such heating at fixed position O while reciprocating optical fiber 10 in A direction and B direction centering on fixed position O, tapered optical fiber 10' having any tapering profile at thin portion S can be manufactured.

As mentioned above, in manufacturing system 1 according to the present invention, since shifters 11, 12, which reciprocate an optical fiber mounted at positions having prescribed distance (L1+L2) therebetween in longer direction X (A direction and B direction) of optical fiber 10 serves as a broadening unit, in order to increase mounting distance (L1+L2) of optical fiber 10. Therefore, mounting distance (L1+L2) of optical fiber 10 can be expanded and optical fiber 10 can be drawn when optical fiber 10 is reciprocated while heating. Since the heating of reciprocating optical fiber 10 is performed at fixed position O, there are no unstable elements with respect to temperature due to, for example, fluctuation of flame 13b, and optical fiber 10 can be heated at a constant temperature. As the result, since optical fiber 10 can be drawn under a condition in which the temperature is controlled with a high precision, tapered optical fiber 10' having a good outer diameter accuracy and a high reproducibility can be manufactured. By the thus manufactured tapered optical fiber 10', light transmission loss can be reduced, thereby increasing the light transmittance.

Particularly in the example of manufacturing a conventional optical coupler, when heating, melting, and drawing optical fiber 10, a heating source is reciprocated in the longer direction of the optical fiber. By the reciprocation of a heating source, a flame fluctuation occurs and the temperature at a heating portion can not be made constant, and the reproducibility of the outer diameter of a drawn optical fiber has been poor. In the present invention, however, since fluctuation of flame 13b does not occur, such a problematic decrease in the reproducibility of the outer diameter is dissolved. In the present invention, since a fixed flame which does not generate fluctuation is used, and further, the reciprocation of optical fiber 10 is controlled as mentioned above, the optical fiber does not have a locally thin portion; and since the temperature distribution can be also controlled, tapered optical fiber 10' having a desired tapering profile can be manufactured.

<Example of Manufacturing>

An example of manufacturing a tapered optical fiber by using a manufacturing system of a tapered optical fiber according to the present invention will now be described.

Manufacturing of tapered optical fiber 10' includes: a reciprocating step in which an optical fiber 10 mounted at positions having prescribed distance (L1+L2) therebetween is reciprocated in longer direction X (A direction and B direction) of optical fiber 10; a heating step in which the reciprocating optical fiber is heated at fixed position O. During the heating performed while reciprocating optical fiber 10, mounting distance (L1+L2) of optical fiber 10 is increased, and optical fiber 10 is drawn. By including such steps, since optical fiber 10 is heated while reciprocating optical fiber 10 at fixed position O, there are no unstable elements with respect to temperature due to, for example, flame fluctuation, and optical fiber 10 can be heated at a constant temperature. Since optical fiber 10 is drawn while mounting distance (L1+L2) of optical fiber 10 is increased during the heating, tapered optical fiber 10' having a good outer diameter accuracy and a high reproducibility can be manufactured. The thus manufactured tapered optical fiber 10' can have reduced light transmission loss, thereby increasing the light transmittance.

First Experimental Example

The first Experimental Example will be described with reference to FIGS. 1 to 3. (1) First, optical fiber 10 is fixed by mounting unit 17, 18 on first stage 23 and second stage 24. (2) To reference point (center point) O where optical fiber 10 is reciprocated, torch 13b which is a heating unit is brought close, and optical fiber 10 is heated. Here, torch 13b has at its tip nozzle 13a having an outer diameter of 0.8 mm, and flame 13b obtained by burning a mixed gas of hydrogen and oxygen introduced from gas introducing portion 13c is generated at nozzle 13a thereof.

(3) The reciprocating profile of optical fiber 10 is listed on Table 1. (i) In step 1, optical fiber 10 is reciprocated in A direction and B direction in the longer direction X of optical fiber 10 centering on reference point O under conditions of range of reciprocal movement W (W1, W2) of 4 mm (W1: 4 mm in A direction, W2: 4 mm in B direction) and a reciprocal movement speed of 3 mm/sec. Here, the reciprocation is performed by controlling first driving motor 15 and second driving motor 16. (ii) In step 2, when a heating portion of optical fiber 10 softens, distances L1, L2 of first stage 23 and second stage 24 from reference point O are increased at a speed of 1 mm/sec while maintaining the above-mentioned range of reciprocal movement W and the reciprocal movement speed. The broadening is performed until the distances become L1+2 mm and L2+2 mm, specifically, broadening width ΔW is increased by 4 mm in total (ΔW=ΔW1+ΔW2). In other words, broadening widths ΔW1, ΔW2 in A direction and B direction are each 2 mm. Here, the broadening is performed by controlling first driving motor 15 and second driving motor 16. (iii) In step 3, range of reciprocal movement W is increased up to 12 mm (W1: 12 mm in A direction, W2: 12 mm in B direction), and the reciprocal movement speed is also increased up to 5 mm/sec, and further, optical fiber 10 is reciprocated in the longer direction X of optical fiber 10 centering on reference point O under conditions of a broadening velocity of 1 mm/see and a broadening width ΔW up to 24 mm (L1+12 mm and L2+12 mm, ΔW1=ΔW2=12 mm). (iv) In step 4, range of reciprocal movement W is reduced to 2 mm (W1: 2 mm in A direction, W2: 2 mm in B direction), the reciprocal movement speed is also reduced down to 3 mm/sec, and further, optical fiber 10 is reciprocated in the longer direction X of optical fiber 10 centering on reference point O under conditions of broadening velocity of 1 mm/sec, and a broadening width ΔW up to 46 mm (L1+23 mm and L2+23 mm, ΔW1=ΔW2=23 mm). (v) In step 5, range of reciprocal movement W is increased up to 4 mm (W1: 4 mm in A direction, W2: 4 mm in B direction), the reciprocal movement speed is also increased up to 4 mm/sec, and further, optical fiber 10 is reciprocated in the longer direction X of optical fiber 10 centering on reference point O under conditions of broadening velocity of 1 mm/sec, and a broadening width ΔW up to 60 mm (L1+30 mm and L2+30 mm, ΔW1=ΔW2=30 mm). In this Experimental Example, steps 1 to 4 were performed in the order mentioned, and L1 and L2 were set to 20 mm.

TABLE 1

|  | Range of reciprocal movement (mm) | Reciprocal movement speed (mm/second) | Broadening width (mm) |
| --- | --- | --- | --- |
| Step 1 | 4 | 3 | — |
| Step 2 | 4 | 3 | 4 |
| Step 3 | 12 | 5 | 24 |
| Step 4 | 2 | 3 | 46 |
| Step 5 | 4 | 4 | 60 |

Figure 4:
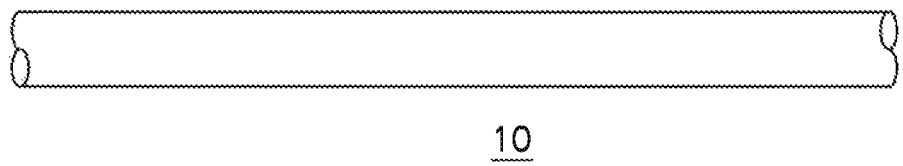
FIG. 4A is a pattern diagram of an optical fiber before the fiber is thinned and FIG. 4B is a pattern diagram of a thinned optical fiber.
Figure 4:
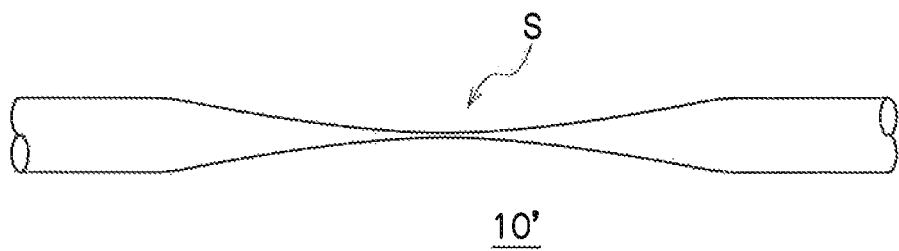

(4) Lastly, tapered optical fiber 10' of a pattern diagram illustrated in FIG. 4(B) was detached from first stage 23 and second stage 24.

Figure 5:
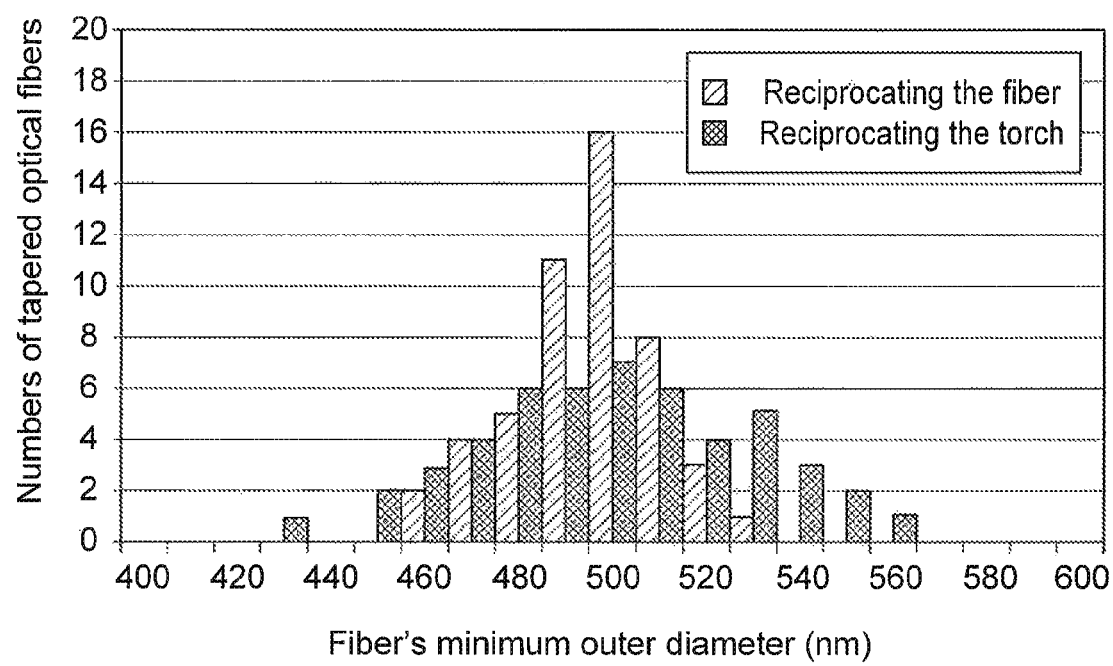
FIG. 5 is a graph illustrating the minimum outer diameter frequency distribution of the obtained plurality of tapered optical fibers.

FIG. 5 is a graph illustrating the minimum outer diameter frequency distribution of 100 tapered optical fibers 10' obtained by repeating such an experiment. The standard deviation of the minimum outer diameter of tapered optical fiber 10' obtained in the Present invention was 14.5 nm, which was very small standard deviation compared with that of a conventional tapered optical fiber, for example 29.1 nm, obtained by reciprocating a torch.

Figure 6:
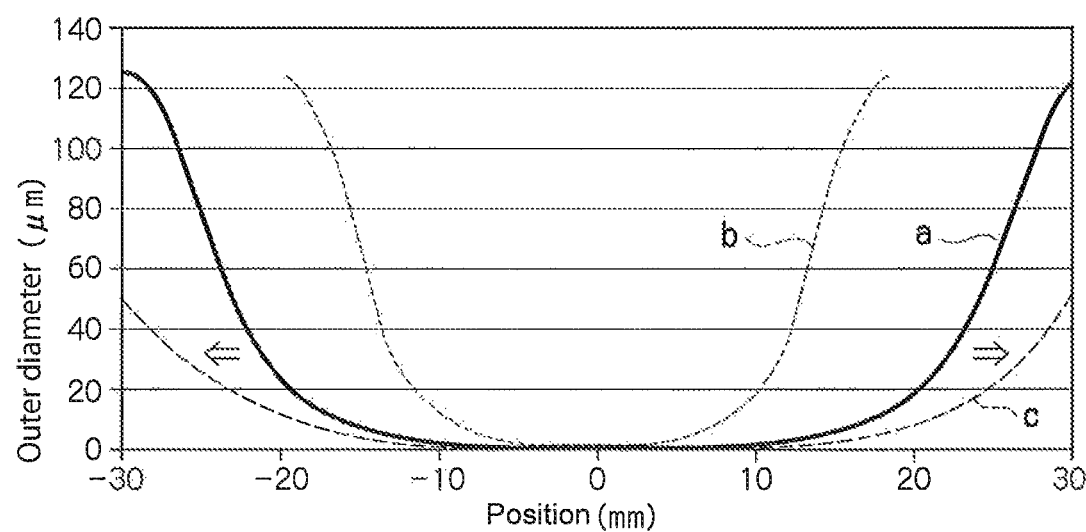
FIG. 6 is a graph illustrating one example of the tapering profile of a tapered optical fiber according to the present invention.

FIG. 6 is a graph illustrating one example of the tapering profile of tapered optical fiber 10' obtained. Curved line "a." is the tapering profile of tapered optical fiber 10' obtained in the first Experimental Example. The center "0" corresponds to the position of the above-mentioned reference point O. Curved line "b" is the tapering profile of tapered optical fiber 10' obtained by only not reciprocating and applying only the broadening condition in the above-mentioned first Experimental Example. As illustrated in FIG. 6, tapered optical fiber 10' according to the present invention obtained by, reciprocating under prescribed conditions was able to exhibit a moderate tapering profile. On the other hand, tapered optical fiber 10' obtained without reciprocating exhibited a steep tapering profile. The difference therebetween influenced the result of the transmittance of a light penetrating tapered optical fiber 10'. Tapered optical fiber 10' whose tapering profile is moderate curved line "a" had a light transmittance of about 95%, while tapered optical fiber 10' whose tapering profile is steep curved line b had a light transmittance of about 60%.

Second Experimental Example

The second Experimental Example will also be described in a similar manner to the above-mentioned first Experimental Example with reference to FIGS. 1 to 3. (1) First, optical fiber 10 is fixed by mounting unit 17, 18 on first stage 23 and second stage 24. (2) To reference point (center point) O where optical fiber 10 is reciprocated, torch 13b, a heating unit, is brought close, and optical fiber 10 is heated. Here, torch 13b has at its tip nozzle 13a having an outer diameter of 0.8 mm, and flame 13b obtained by burning a mixed gas of hydrogen and oxygen introduced from gas introducing portion 13c is generated at nozzle 13a thereof.

The reciprocating profile of optical fiber 10 is listed on Table 2. (i) In step 1, optical fiber, 10 is reciprocated in A direction and B direction in the longer direction X of optical fiber 10 centering on reference point O under conditions of range of reciprocal movement W (W1, W2) of 10 mm (W1: 10 mm in A direction, W2: 10 mm in B direction) and a reciprocal movement speed of 6 mm/sec. Here, the reciprocation is performed by controlling first driving motor 15 and second driving motor 16. (ii) In step 2, when a heating portion of optical fiber 10 softens, distances L1, L2 of first stage 23 and second stage 24 from reference point O are increased at a speed of 0.4 mm/sec while maintaining the above-mentioned range of reciprocal movement W and the reciprocal movement speed. The broadening is performed until the distances become L1+8 mm and L2+8 mm, in other words, broadening width ΔW is increased by 16 mm in total (ΔW=ΔW1+ΔW2). Here, the broadening is performed by controlling first driving motor 15 and second driving motor 16. (iii) In step 3, range of reciprocal movement W is increased up to 14 mm (W1: 14 mm in A direction, W2: 14 mm in B direction), and the reciprocal movement speed remains at 6 mm/sec, and further, optical fiber 10 is reciprocated in the longer direction X of optical fiber 10 centering on reference point O under conditions of a broadening velocity of 0.1 mm/sec and a broadening width ΔW up to 32 mm (L1+16 mm and L2+16 mm, ΔW1=ΔW2=16 mm). (iv) In step 4, range of reciprocal movement W is remained at 14 mm (W1: 14 mm in A direction, W2: 14 mm in B direction), the reciprocal movement speed is also remained at 6 mm/sec, and further, optical fiber 10 is reciprocated in the longer direction X of optical fiber 10 centering on reference point O under conditions of broadening velocity of 0.4 mm/sec, and a broadening width ΔW up to 42 mm (L1+21 mm and L2+21 mm, ΔW1=ΔW2=21 mm). (v) in step 5, range of reciprocal movement W is reduced to 6 mm (W1: 6 mm in A direction, W2: 6 mm in B direction), the reciprocal movement speed is remained at 6 mm/sec, and further, optical fiber 10 is reciprocated in the longer direction X of optical fiber 10 centering on reference point O under conditions of broadening velocity of 0.6 mm/sec, and a broadening width ΔW up to 46 mm (L1+23 mm and L2+23 mm, ΔW1=ΔW2=23 mm). (vi) In step 6, range of reciprocal movement W is reduced to 3 mm (W1: 3 mm in A direction, W2: 3 mm in B direction), the reciprocal movement speed is remained at 6 mm/sec, and further, optical fiber 10 is reciprocated in the longer direction X of optical fiber 10 centering on reference point O under conditions of broadening velocity of 1.2 mm/sec, and a broadening width ΔW up to 56 mm (L1+28 mm and L2+28 mm, ΔW1=ΔW2=28 mm). In this Experimental Example, steps 1 to 6 were performed in the order mentioned, and L1 and L2 were set to 15 mm.

TABLE 2

|  | Range of reciprocal movement (mm) | Reciprocal movement speed (mm/second) | Broadening width (mm) |
| --- | --- | --- | --- |
| Step 1 | 10 | 6 | — |
| Step 2 | 10 | 6 | 16 |
| Step 3 | 14 | 6 | 32 |
| Step 4 | 14 | 6 | 42 |
| Step 5 | 6 | 6 | 46 |
| Step 6 | 3 | 6 | 56 |

(4) Lastly, tapered optical fiber 10' of a pattern diagram illustrated in FIG. 4(B) was detached from first stage 23 and second stage 24.

Figure 7:
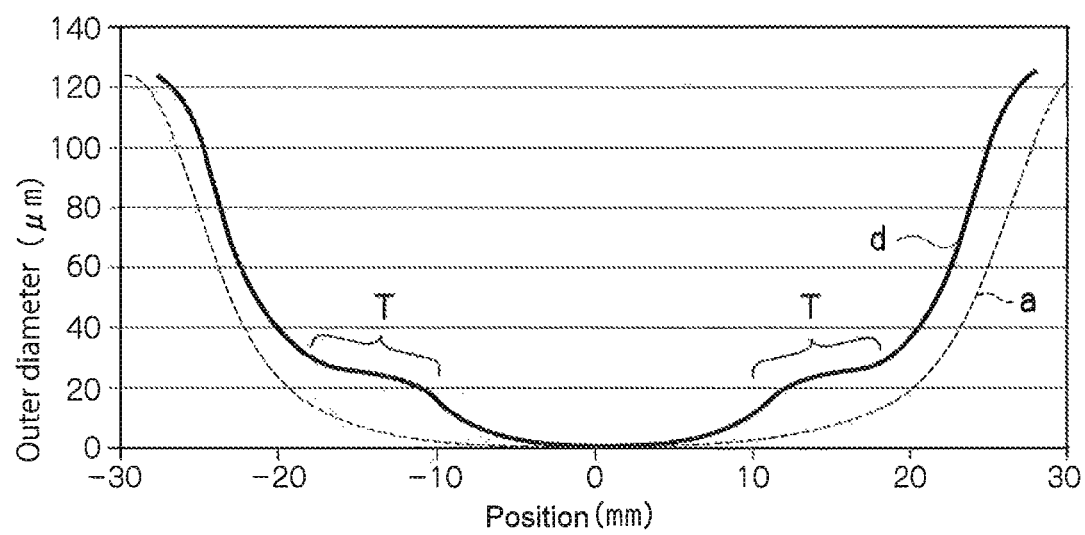
FIG. 7 is a graph illustrating another example of the tapering profile of a tapered optical fiber according to the present invention.

FIG. 7 is a graph illustrating one example of the tapering profile of tapered optical fiber 10' obtained. Curved line a is the tapering profile of tapered optical fiber 10' obtained in the first Experimental Example, and curved line d is the tapering profile of tapered optical fiber 10' obtained in the second Experimental Example. The center 0 corresponds to the position of the above-Mentioned reference point O. The tapering profile of tapered optical fiber 10' curved line d is different from the tapering profile of tapered optical fiber 10' curved line a and has in curved lined inflection portion T, T where the inclination is small. Inflection portion T, T exists in a range of the outer diameter of 20 μm to 30 μm.

Such inflection portion T, T can lead to effective characteristics of minimizing a conversion loss (mode conversion loss) in which a state of trapping a light in a core by a clad is changed into a state of trapping a light in a clad by an air or vacuum. Particularly when the inflection portion exist in a range of 20 μm to 30 μm, there is a special advantage that the transmittance can be made large by minimizing the characteristics of mode conversion loss of an optical fiber having a transmission wavelength of, for example, about 800 nm to 1600 nm.

Figure 10:
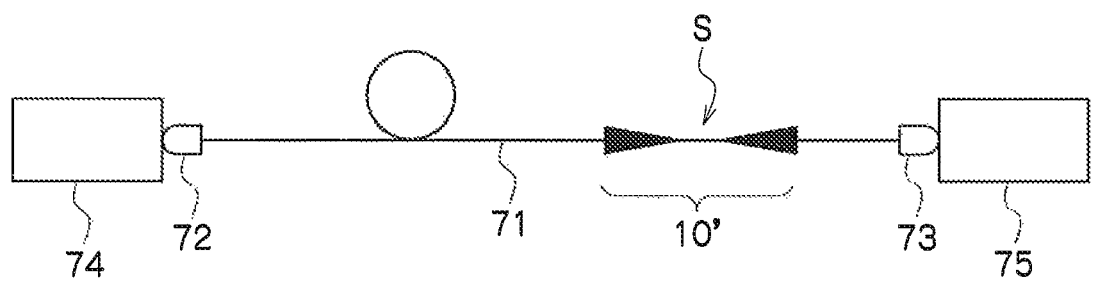
FIG. 10 represents a measurement system of the transmission loss of a tapered optical fiber according to the present invention.

The measurement of the light transmittance in the above-mentioned Experimental Example was performed by measuring the transmission loss illustrated in FIG. 10. In FIG. 10, reference numeral S represents a thin portion S of tapered optical fiber 10'; reference numeral 71 represents single mode optical fiber; reference numerals 72, 73 represent optical connector; reference numeral 74 represents a light source; and reference numeral 65 represents an optical power meter. As the light source, a laser light having an oscillation wavelength of 850 nm was used, and as the optical power meter, an optical multimeter and sensor unit (manufactured by Yokogawa Electric Corporation (former Ando Electric Co., Ltd.), Type: AQ2140 and AQ2735) was used. The thinning loss was evaluated by dB=−10 log (P1/P0). The tapering profile was evaluated by the result obtained by measuring the outer diameter of each portion of tapered optical fiber 10' using an electron microscope (manufactured by Keyence Corporation, Type: VE-8800).

The above-mentioned Experimental Example is only for illustration, and a manufacturing system and a manufacturing method of a tapered optical fiber according to the present invention are a very effective system and method in which tapered optical fiber 10' having the tapering profile illustrated in FIG. 6 or FIG. 7 can be obtained, and, at the same time, tapered optical fiber 10' having other tapering profile can be freely designed by setting components the fiber has, or by setting control conditions.

[Tapered Optical Fiber and Optical Fiber Module]
<Tapered Optical Fiber>

Tapered optical fiber 10' according to the present invention is a seamless optical fiber thinned by the above-mentioned manufacturing system of a tapered optical fiber according to the present invention (for example, see FIGS. 1 to 3) or manufacturing method. As illustrated in FIG. 4(B), the optical fiber according to the present invention has in longer direction X thin portion S with a minimum outer diameter of 200 nm to 800 nm, and the tapering profile of thin portion S in the longer direction is symmetrical or asymmetrical shape. Such tapered optical fiber 10' has a good outer diameter accuracy and has a high reproducibility. As the result, because the light transmission loss of tapered optical fiber 10' can be reduced, the light transmittance of tapered optical fiber 10' can be increased.

The example of obtained tape d opt cal fiber 10' is typified by tapered optical fibers 10' obtained in the above-mentioned first Experimental Example (the tapering profile of reference numeral a in FIG. 6) and second Experimental Example/tapering profile of reference numeral d in FIG. 7), and a tapered optical fiber having other tapering profile is also included in tapered optical fiber 10' according to the present invention.

For example, the curved line represented by reference numeral a in FIG. 6 is the tapering profile of tapered optical fiber 10', which is obtained by thinning optical fiber 10, having thin portion S with a length of 60 mm, and with an outer diameter of about 125 μm. Tapered optical fiber 10' is thinned such that the minimum outer diameter is about 400 nm, and the curved line is a graph obtained by setting a point representing the minimum outer diameter to reference point O (see FIG. 1). The point "position 0" in the abscissa axis in FIG. 6 corresponds to reference point O. For tapered optical fiber 10', at reference point O, the minimum outer diameter is about 400 nm; at points of reference point O±10 mm, the outer diameter is about 3.5 μm; at points of reference point O±20 mm, the outer diameter is about 20 μm; and at points of reference point O±30 mm, the outer diameter is about 125 μm which is original outer diameter.

For example, the curved line represented by reference numeral "c" in FIG. 6 is a part of the tapering profile of tapered optical fiber 10', which is obtained by thinning optical fiber 10, having thin portion S with a length of about 125 mm (not illustrated) and with an outer diameter of about 125 μm. Tapered optical fiber 10' is thinned such that the minimum outer diameter is about 400 nm. For tapered optical fiber 10', at reference point O, the minimum outer diameter is about 400 nm; at points of reference point O±10 mm, the outer diameter is about 2 μm; at points of reference point O±20 mm, the outer diameter is about 10 μm; and at points of reference point O±30 mm, the outer diameter is about 50 μm; and at points of reference point O±60 mm, the outer diameter is about 125 μm which is original outer diameter.

The curved line represented by reference numeral "d" in FIG. 7 is the tapering profile of tapered optical fiber 10', which is obtained by thinning optical fiber 10, having thin portion S with an outer diameter of about 125 μm and with a length of about 60 mm. Tapered optical fiber 10' is thinned such that the minimum outer diameter is 400 nm, and the curved line is a graph obtained by setting a point representing the minimum outer diameter to reference point O (see FIG. 1). The point "position 0" in the abscissa axis in FIG. 7 corresponds to reference point O. For this tapered optical fiber 10', at reference point O, the minimum outer diameter is about 400 nm; at points of reference point O±10 mm, the outer diameter is about 10 μm; in a range of reference point O±12 mm to ±18 mm, provided is inflection portion T in which the inclination of the profile becomes small, the rate of change in the outer diameter is small, and the outer diameters are in a range of about 20 μm to about 30 μm; at points of reference point O±20 mm, the outer diameter is about 40 μm; and at points of reference point O±25 mm, the outer diameter is about 125 μm which is original outer diameter.

As illustrated in the tapering profile of reference numeral "d" in FIG. 7, tapered optical fiber 10' according to the present invention is also characterized in that the tapering profile of thin portion S has inflection portion T in which the rate of change in the outer diameter in the longer direction X becomes small. Such inflection portion T can lead to effective characteristics of minimizing a conversion loss (mode conversion loss) in which astute of trapping a light in a core by a clad is changed into astute of trapping a light in a clad by an air or vacuum.

Generally, a change in the angle between the boundary surface of a core and a clad and a light direction is one of the cause in which the mode conversion of a light travelling in the core of an optical fiber is generated. A tapered portion formed in tapered optical fiber 10' is a region where occurs a change in the angle between the boundary surface of a core and a clad and a light direction. Therefore, the mode conversion is generated at the tapered portion. Such the generation of the mode conversion is a cause of a conversion loss. Making taper angle at the tapered portion small is effective for reducing the conversion loss. However, when the taper angle at the tapered portion is made small, the tapered portion becomes long, and therefore, the distance between a portion where tapered optical fiber 10' begins to become thin and thin portion S becomes long.

On the other hand, the length of the tapered portion of tapered optical fiber 10' is limited to a length in accordance with a product to which tapered optical fiber 10' is applied. When the length of the tapered portion is formed in accordance with the length of a product to which the tapered optical fiber is applied, the taper angle of the tapered portion becomes large.

Inflection portion T is a configuration for attaining both an object of reducing such a conversion loss and an object of forming the length of the tapered portion to a length in accordance with a product to which the tapered optical fiber is applied. As mentioned above, the conversion loss occurs at a position where the angle between the boundary surface of a core and a clad, and a light direction changes. However, in a region between a position where the diameter of tapered optical fiber 10' starts to decrease and a position several μm therefrom on the side of thin portion S, even where the portion is formed having a large taper angle, the conversion loss is hardly generated. For this reason, by providing a region where the taper angle is small at a portion several urn from a position where the diameter of tapered optical fiber 10' starts to decrease on the side of thin portion S, the configuration in which the occurrence of a conversion loss is effectively inhibited is obtained. Inflection portion T of tapered optical fiber 10' is provided in a region where the conversion loss due to the mode conversion is generated.

The outer diameters of such inflection portion T can be adjusted to any values. In an example of FIG. 7, such inflection portion T is provided in a range of the outer diameter of about 20 μm to 30 μm. It is specifically advantageous to provide inflection portion T in this range, because the characteristics of the mode conversion loss of an optical fiber having a transmission wavelength of, for example, about 800 nm to 1600 nm, can be made small compared with tapered optical fiber 10' without inflection portion T, thereby increasing the transmittance. Tapered optical fiber 10' having such inflection portion T can attain a communication at wavelength of about 800 nm to 1600 nm.

Tapered optical fiber 10' according to the present invention is not limited to tapered optical fiber 10' having the above-mentioned tapering profile of reference numeral "a" in FIG. 6 or tapered optical fiber 10' having the above-mentioned tapering profile of reference numeral "d" in FIG. 7, and also includes those having a variety of tapering profiles having a minimum outer diameter in a range of from 200 nm to 800 nm. In particular, tapered optical fiber 10' having a very small minimum outer diameter in a range of from 200 nm to 500 nm is preferred. Tapered optical fiber 10' having thin portion S having such range of outer diameters is particularly suitable for an optical fiber for a quantum info-communication. Further, tapered optical fiber 10' has an advantage that a high light transmittance is increased when the optical fiber has a tapering profile in which the outer diameter is gradually increased from a point (reference point O) with the minimum outer diameter. Examples of a tapering profile in which the outer diameter is gradually increased include those in which the outer diameters from reference point O to reference point O±10 mm are 1 μm to 10 μm, and preferably 1 μm to 5 μm.

Inflection portion T is a region where the rate of change in the outer diameter of tapered optical fiber 10' in the longer direction X is small. In other words, that the rate of change in the outer diameter of tapered optical fiber 10' in the longer direction X is small means that the degree of decreasing diameter thereof in the longer direction X is small. Inflection portion T also can be referred to as "the inclination of thinning". For example, in a range from the minimum outer diameter to an outer diameter of about 20 μm, the inclination of thinning is 10 mrad or smaller, preferably 6 mrad or smaller; in a range from an outer diameter of 20 μm to 30 μm, the inclination of thinning is 1 mrad or smaller, preferably 0.5 mrad or smaller; and in a range from an outer diameter of 30 μm to 125 μm, the inclination of thinning is 10 mrad or smaller, preferably 6 mrad or smaller. When the inclination of thinning is in the above range, the transmission loss of tapered optical fiber 10' can be reduced, thereby increasing the light transmittance as an advantage. On the other hand, when the inclination of thinning exceeds the above range, the transmission loss of tapered optical fiber 10' is increased. Therefore, the light transmittance is reduced as a disadvantage.

As described above, tapered optical fiber 10' according to the present invention has in longer direction X thin portion S having a minimum outer diameter of 200 nm to 800 nm. Further, the tapering profile of thin portion S has seamless symmetrical or asymmetrical shape in the longer direction X. Therefore, such tapered optical fiber 10' has a good outer diameter accuracy and has a high reproducibility. As the result, the light transmission loss can be reduced, and the light transmittance can be increased. Tapered optical fiber 10' according to the present invention is also characterized in that the tapered optical fiber is seamless, and is obviously different in its structure from a conventional optical fiber coupler having a seam joint or a mark of a seam joint.

<Optical Fiber Module>

Figure 8:
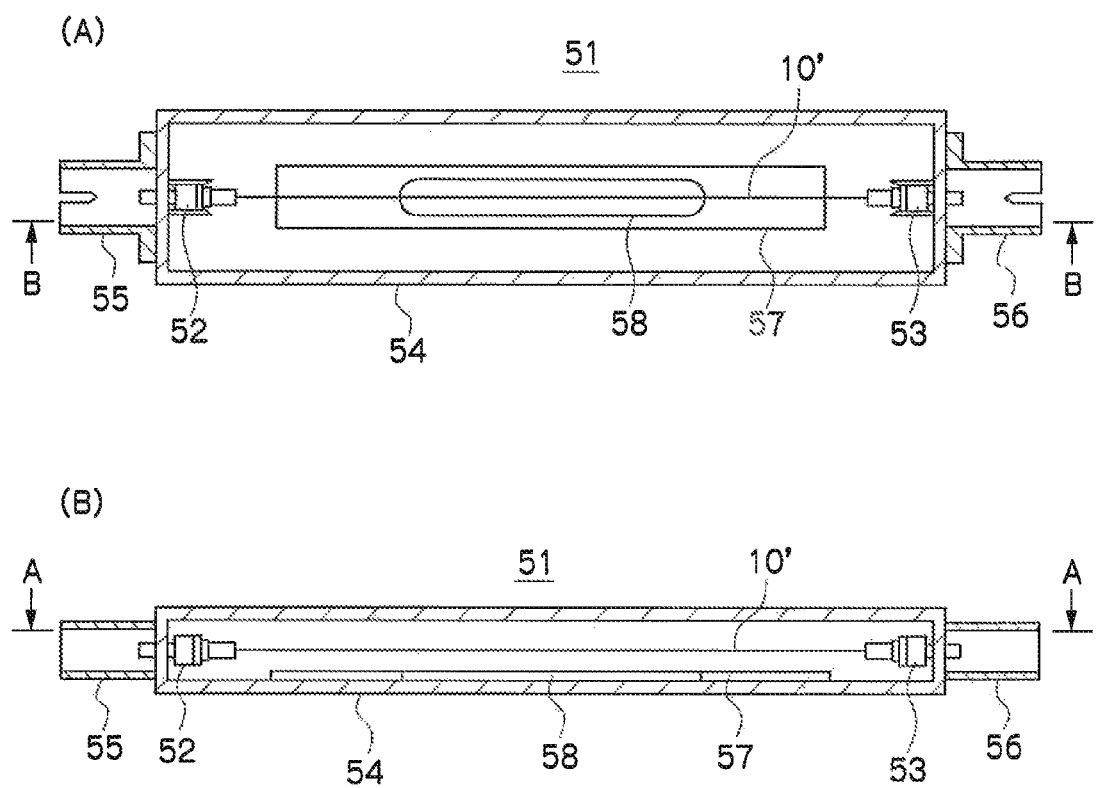
FIGS. 8A and 8B are schematic plan view and front view of one example of an optical fiber module according to the present invention.
Figure 9:
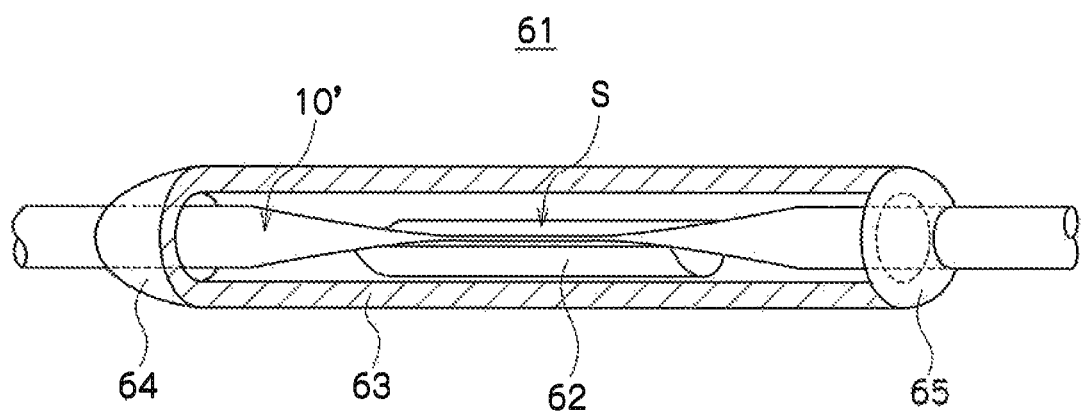
FIG. 9 is a schematic perspective view illustrating another example of an optical fiber module according to the present invention.

Optical fiber modules 51, 61 according to the present invention has, as shown in two embodiments illustrated in FIG. 8 and FIG. 9, tapered optical fiber 10' according to the present invention and frame body 54, 63 accommodating therein tapered optical fiber 10'. Such, optical fiber modules 51, 61 can be used as an optical fiber, module for, for example, a quantum info-communication.

First Embodiment

FIG. 8 (A) is a cross-sectional view taken along A-A in FIG. 8 (B), and FIG. 8 (B) is a cross-sectional view taken along B-B in FIG. 8 (A). Optical fiber module 51 has: tapered optical fiber 10' with a prescribed length; optical fiber connectors 52, 53 which are connected to both ends of tapered optical fiber 10'; and frame body 54 which accommodates tapered optical fiber 10' and fixes tapered optical fiber 10' via optical fiber connectors 52, 53. In optical fiber module 51, connecting terminal boxes 55, 56, by which optical fiber connectors 52, 53 are connected with an external terminal, are provided. Connecting terminal boxes 55, 56 can be optionally provided. Reference numeral 57 represents an optical fiber fixing plate, and reference numeral 58 represents a hollow portion of optical fiber fixing plate 57. Tapered optical fiber 10' is preferably fixed to optical fiber fixing plate 57 by adhesives or the like.

In optical fiber module 51, thin portion S of tapered optical fiber 10' is arranged over hollow portion 58 of optical fiber fixing plate 57. Optical fiber connectors 52, 53 are not particularly restricted as long as they are a common optical fiber connector. For example, optical fiber connectors 52, 53 are configured such that they are inserted into a ferrule made of zirconia or the like. Although a box frame body is illustrated for frame body 54 in an example of FIG. 8, frame body 54 is not necessarily a box shaped, and may be a pipe shape or other shape. Each of connecting terminal boxes 55, 56 is a terminal box for connecting an external terminal which inputs and outputs light signal from outside, which is also not particularly restricted, and those, commonly used as a connecting terminal to an optical fiber connector, can be applied.

Since such optical fiber module 51 is fixed to frame body 54 and sealed, the module is hard to be influenced by a disturbance factor from outside such as an air current, a dust, or a change in temperature. Since optical fiber Module 51 mounts tapered optical fiber 10' having a very small minimum outer diameter of from 200 nm to 800 nm, the module can attain a stable communication such as a quantum info-communication, and is advantageous.

Second Embodiment

FIG. 9 is a partially cutaway perspective view of optical fiber module 61 having tapered optical fiber 10'. Optical fiber module 61 has: tapered optical fiber 10'; and frame body 63 which accommodates therein tapered optical fiber 10', and fixes tapered optical fiber 10' via adhesives 64, 65 provided on both sides of tapered optical fiber 10'.

In optical fiber module 61, thin portion S of tapered optical fiber 10' is placed on placing member 62. By placing thin portion S on placing member 62, breaking of wire or the like of thin portion S due to a disturbance factor such as vibration can be prevented. Since placing member 62 is constituted in a shape obtained by halving a hollow cylinder, thin portion S can be placed on the plane portion of halved hollow cylinder in a stable state. Tapered optical fiber 10' is adhered to both sides of halved placing member 62 by an adhesive (not illustrated) and fixed. Halved placing member 62 is fixed on the inner surface of pipe frame body 63 by an adhesive (not illustrated). Placing member 62 is preferably glass or quartz. In particular, it is advantageous to use placing member 62 made of quartz, because it has the same coefficient of linear expansion to that of tapered optical fiber 10' of a quartz optical fiber, and thus the rate of breaking of wire due to change in temperature can be reduced.

Since such optical fiber module 61 is fixed to frame body 63, which is pipe-shaped in an example of FIG. 9, and sealed at both ends of pipe frame body 63 by adhesives 64, 65, the module is hard to be influenced by a disturbance factor from outside such as an air current, a dust, or a change in temperature. Since optical fiber module 61 mounts tapered optical fiber 10' having a very small minimum outer diameter of 200 nm to 800 nm, the module can attain a stable communication Such as a quantum info-communication, and thus is advantageous.

At positions (on extension line) further from adhesives 64, 65 on both sides of optical fiber module 61, an optical fiber connector, similar to optical fiber connectors 52, 53 illustrated in FIG. 8, may be provided. Such an optical fiber connector is not particularly restricted as long as the connector is a common optical fiber connector. Although, for frame body 63, a pipe shaped frame body is preferably illustrated, it is not necessary to use a pipe shaped frame body, and a frame body having a box shape or other shape may be used.

DESCRIPTION OF THE REFERENCE NUMERALS

1 Manufacturing system of tapered optical fiber
10 Optical fiber
10' Tapered optical fiber
11 First shifter
12 Second shifter
13 Torch
13a Tip nozzle
13b Torch (flame)
13c Gas introducing portion
14 Moving stage forth torch
14a Elevation drive unit
14b forward and back movement drive unit
15 First drive motor
16 Second drive motor
17 Mounting unit (first clamp)
18 Mounding unit (second clamp)
19, 20 Linear guide
21, 22 Fixing jig
23 First stage
24 Second stage
25a, 25b V-Groove
51 Optical fiber module
52, 53 Optical fiber connector
54 Frame body (box frame body)
55, 56 Connecting terminal box
57 Optical fiber fixing plate
58 Hollow portion of optical fiber fixing plate
61 Optical fiber module
52 Placing member
63 Frame body (pipe shape frame body)
64, 64 Adhesive
71 Single mode optical fiber
72, 73 Optical connector
74 Light source
75 Optical power meter
A Shift of left
B Shift of right
L1 Distance from the reference point to the first clamp
L2 Distance from the reference point to the second clamp
O Reference point (center point)
P Position of the first clamp
Q Position of the second clamp
S Thin portion of the tapered optical fiber
T Inflection portion
W Range of reciprocal movement
W1 Movement range in A direction
W2 Movement range in B direction
ΔW Broadening width
X Longer direction

The invention claimed is:

1. A manufacturing system of a tapered optical fiber, comprising:
a mounting unit that fixes an optical fiber at mounting positions that are spaced apart from each other in a direction of the optical axis of the optical fiber;
a shifter that reciprocates the optical fiber in the direction of the optical axis by controlling the mounting unit; and
a heating device that heats the reciprocating optical fiber at a fixed position that is located between the mounting positions,
wherein the shifter changes at least one of a range of reciprocal movement of the mounting unit, reciprocal movement speed of the mounting unit, and broadening width of the optical fiber, and
wherein the resulting optical fiber has a tapering profile that has at least one inflection portion, the inflection portion having a rate of change in an outer diameter that substantially decreases relative to the rate of change in the outer diameter of taper portions directly adjacent to the inflection portion.

2. The manufacturing system of the tapered optical fiber according to claim 1, wherein
the shifter controls one-way speed and another-way speed of the reciprocal movement speed of the mounting unit are the same or different from each other, the one-way speed and another-way speed be in the range of from 1 mm/s to 30 mm/s.

3. The manufacturing system of the tapered optical fiber according to claim 1, wherein
the shifter changes the range of reciprocal movement of the mounting unit over time.

4. The manufacturing system of the tapered optical fiber according to claim 1, wherein
the shifter controls the broadening width of the optical fiber by changing the change rate of the distance between the mounting positions in stages.

5. The manufacturing system of the tapered optical fiber according to claim 1, wherein the mounting unit is controlled independently or interlockingly.

6. The manufacturing system of the tapered optical fiber according to claim 1, wherein the shifter has:
a guide that guides the movement of the mounting unit in the direction of the optical axis; and
a drive motor that drives the guide.

7. A manufacturing method of a tapered optical fiber, comprising:
a reciprocating step of reciprocates an optical fiber in the direction of the optical axis of the optical fiber by controlling mounting unit that fixes the optical fiber at mounting positions, the mounting positions be spaced apart from each other in the direction of the optical axis; and
a heating step of heating the reciprocating optical fiber at a fixed position that is located between the mounting positions,
wherein, in the reciprocating step, at least one of a range of reciprocal movement of the mounting unit, reciprocal movement speed of the mounting unit, and broadening width of the optical fiber is changed, the optical fiber having a tapering profile that has at least one inflection portion, the inflection portion having a rate of change in an outer diameter that substantially decreases relative to the rate of change in the outer diameter of taper portions directly adjacent to the inflection portion.

8. A tapered optical fiber extended seamlessly in a direction of the optical axis, and manufactured by a manufacturing system of the tapered optical fiber, the manufacturing system comprising
a mounting unit that fixes an optical fiber at mounting positions that are spaced apart from each other in a direction of the optical axis of the optical fiber;
a shifter that reciprocates the optical fiber in the direction of the optical axis by controlling the mounting unit; and
a heating device that heats the reciprocating optical fiber at a fixed position that is located between the mounting positions,
wherein the shifter changes at least one of a range of reciprocal movement of the mounting unit, reciprocal movement speed of the mounting unit, and broadening width of the optical fiber, and
wherein the resulting optical fiber has a tapering profile that has at least one inflection portion, the inflection portion having a rate of change in an outer diameter that substantially decreases relative to the rate of change in the outer diameter of taper portions directly adjacent to the inflection portion,
the tapered optical fiber, comprising:
an end portion; and
a thin portion that is tapered toward the center of the tapered optical fiber by gradually reducing an outer diameter of the thin portion in size from an side of the end portion toward the center, wherein
the thin portion has one or more inflection portion that is different in the rate of change in the outer diameter of the thin portion from the other portion of the thin portion or the other inflection portion.

9. The tapered optical fiber according to claim 8, wherein the minimum outer diameter of the thin portion is 200 nm or more and 800 nm or less.

10. The tapered optical fiber according to claim 8, wherein the maximum outer diameter of the tapered optical fiber that us 125 µm, and
a first inclination of thinning is 10 mrad or less in the outer diameter of the thin portion in the range from the minimum outer diameter to 20 µm,
a second inclination of thinning is 1 mrad or less in the outer diameter of the thin portion in the range from more than 20 µm to 30 µm, and
a third inclination of thinning is 10 mrad or less in the outer diameter of the thin portion in the range from more than 30 µm to 125 µm.

11. The tapered optical fiber according to claim 8, wherein the minimum outer diameter of the thin portion is 200 nm or more and 800 nm or less.

12. The tapered optical fiber module, comprising:
the tapered optical fiber according to claim 8; and
a frame body accommodating therein the tapered optical fiber.

13. A tapered optical fiber extended seamlessly in a direction of the optical axis, and manufactured by the manufacturing method of a tapered optical fiber according to claim 7, comprising
an end portion; and
a thin portion that is tapered toward the center of the tapered optical fiber by gradually reducing an outer diameter of the thin portion in size from an side of the end portion toward the center, wherein
the thin portion has one or more inflection portion that is different in the rate of change in the outer diameter of the thin portion from the other portion of the thin portion or the other inflection portion.

14. The tapered optical fiber according to claim 13, wherein
the minimum outer diameter of the thin portion is 200 nm or more and 800 nm or less.

15. The tapered optical fiber according to claim 13, wherein
the maximum outer diameter of the tapered optical fiber that us 125 µm, and
a first inclination of thinning is 10 mrad or less in the outer diameter of the thin portion in the range from the minimum outer diameter to 20 µm,
a second inclination of thinning is 1 mrad or less in the outer diameter of the thin portion in the range from more than 20 µm to 30 µm, and
a third inclination of thinning is 10 mrad or less in the outer diameter of the thin portion in the range from more than 30 µm to 125 µm.

16. The tapered optical fiber according to claim 13, wherein
the minimum outer diameter of the thin portion is 200 nm or more and 800 nm or less.

17. The tapered optical fiber module, comprising:
the tapered optical fiber according to claim 13; and
a frame body accommodating therein the tapered optical fiber.

* * * * *